(12) United States Patent
Assen

(10) Patent No.: US 6,229,122 B1
(45) Date of Patent: May 8, 2001

(54) METHOD AND DEVICE FOR ESTABLISHING A WELD CONNECTION BETWEEN TWO PLASTIC ARTICLES BY MEANS OF HEAT TREATMENT

(75) Inventor: Harry Assen, Sassenheim (NL)

(73) Assignee: Astraco Beheer B.V, Sassenheim (NL)

( * ) Notice: Subject to any disclaimer, the term of this patent is extended or adjusted under 35 U.S.C. 154(b) by 0 days.

(21) Appl. No.: 09/341,509

(22) PCT Filed: Jan. 8, 1998

(86) PCT No.: PCT/NL98/00015

§ 371 Date: Jan. 10, 2000

§ 102(e) Date: Jan. 10, 2000

(87) PCT Pub. No.: WO98/33640

PCT Pub. Date: Aug. 6, 1998

(30) Foreign Application Priority Data

Jan. 10, 1997 (NL) .................................................. 1004963

(51) Int. Cl.[7] .................................................. B29C 65/34
(52) U.S. Cl. ....................... 219/544; 219/535; 156/304.2; 156/273.5
(58) Field of Search .................................... 219/544, 535; 156/304.2, 274.2, 273.5

(56) References Cited

U.S. PATENT DOCUMENTS

| 4,575,618 | 3/1986 | Rosenzweig | 219/535 |
| 4,686,071 | * 8/1987 | Rosenzweig et al. | 156/273.5 |
| 4,978,837 | * 12/1990 | Eggleston | 219/535 |
| 5,125,690 | * 6/1992 | Taylor et al. | 219/544 |
| 5,138,136 | * 8/1992 | Moreau et al. | 219/535 |
| 5,141,580 | * 8/1992 | Dufour et al. | 219/535 |

FOREIGN PATENT DOCUMENTS

| 0093821 | 11/1983 | (EP) . |
| 0129505 | 12/1984 | (EP) . |
| 1-301231 | 12/1989 | (JP) . |

* cited by examiner

*Primary Examiner*—John A. Jeffery
(74) *Attorney, Agent, or Firm*—Joan H. Pauly

(57) ABSTRACT

A method is disclosed for establishing heat treatment of a weld or glue connection between two mutually adjacent surfaces of components, for instance tubes, using respectively an adhesive material, for instance plastic, more particularly epoxy resin. Heat is supplied around or close to the weld surfaces for connecting. In order to measure the correct quantity of supplied heat and prior to the heat supply, a test loop (10) is arranged around the weld. The loop is provided with a temperature-sensitive interrupter (13) and an electric fuse (14) connected in parallel thereto. A predetermined time after the interrupter has responded as a result of the correct temperature being reached, a current surge is passed through the safety fuse in the loop, so that it is possible to determine precisely whether the welding has been carried out for a sufficiently long time and with sufficient heat.

15 Claims, 1 Drawing Sheet

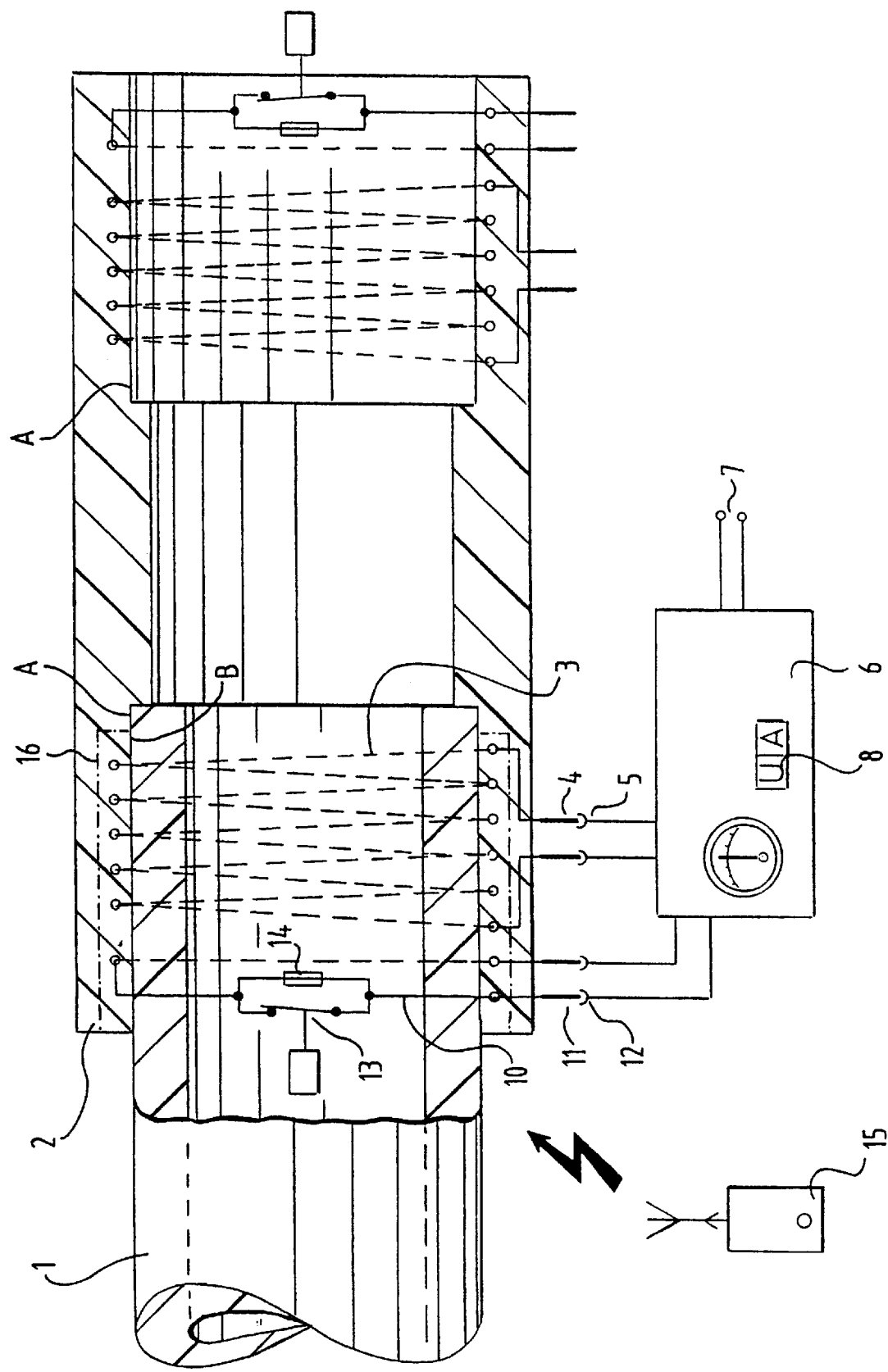

METHOD AND DEVICE FOR ESTABLISHING A WELD CONNECTION BETWEEN TWO PLASTIC ARTICLES BY MEANS OF HEAT TREATMENT

TECHNICAL FIELD

The invention relates to a method for establishing by means of heat treatment a weld or glue connection between two mutually adjacent surfaces of components, for instance tubes, using respectively adhesive material, for instance plastic, more particularly epoxy resin, wherein heat is supplied around or close to the weld surfaces for connecting.

BACKGROUND INFORMATION

The above stated method is frequently used for welding or glueing together plastic articles, for instance a tube end in a sleeve, in order to realize an air- or liquid-tight connection as well as a connection with tensile and pressure strength. In such a weld obtained by means of heat it is very important to have the temperature at the right level in order to soften, melt or cure the plastic materials, and also to have the time duration to ensure that the heat supply has been long enough to establish an intimate connection.

SUMMARY OF THE INVENTION

For this purpose the invention provides a method which is distinguished in that in order to measure the correct quantity of supplied heat and prior to the heat supply a test loop is arranged around the weld provided with a temperature-sensitive interrupter and an electric fuse connected in parallel thereto, and after the interrupter has responded as a result of the correct temperature being reached after a pre-determined time a current surge is passed through the safety fuse in the loop.

Owing to the exceptional test loop according to the invention, it is now possible to monitor in very simple manner during welding as well as thereafter whether the weld has been sufficient to ensure the desired sealing and tensile strength.

Heating of the two plastic objects can take place in random manner, for instance by supplying heat externally by means of a heat blanket and the like, but it is also possible to embed a resistance wire close to the surfaces of the articles for adhering, which wire heats under electric voltage.

The invention further relates to a device for performing the above stated method, which is characterized by a loop-like conducting element which is provided with two members connected in parallel in the form of a temperature-sensitive interrupter on the one hand and a melt wire on the other.

The loop used in the device can also be used to monitor the correct weld after the process has taken place.

If the loop is still fully closed it can be established by generating an external signal by means of a transmitter whether the loop is closed and, if this is the case, one of the parameters has then been insufficient, i.e. the temperature or the time.

The invention will be further elucidated in the figure description of an embodiment hereinbelow.

BRIEF DESCRIPTION OF THE DRAWING

This embodiment is shown schematically in the annexed drawing. The single FIGURE of the drawing is a schematic longitudinal sectional view of the embodiment.

DETAILED DESCRIPTION OF THE INVENTION

Shown in longitudinal section in the drawing is a tube end 1 and a sleeve 2 pushed thereover. The inner surface A of the sleeve must be fixed to the outer surface B of tube end 1.

This fixing takes place by heating these surfaces such that the material at the mutually adjoining surfaces A, B fuses. It is noted that the surfaces can also be coated beforehand with a glue material which brings about adhesion under heat treatment. The tube or sleeve material then does not fuse.

The supplying of heat is shown in the figure by means of a resistance wire 3 which is wound a determined distance around tube end 1 and embedded in the part of the sleeve 2 lying outside the tube end 1. The resistance wire can be connected to two external contacts 4 which can be powered by a plug 5 which is connected to a control box 6, which is supplied in turn by an external voltage source 7. By means of the control button 8 the voltage to the plug 5 and therefore to resistance wire 3 can be switched on and off.

Arranged in addition to resistance wire 3 is a second wire 10 which is placed as a loop around tube end 1. This wire is also provided with external contacts 11 which can be connected to a plug 12, which is likewise connected to control box 6.

The loop 10 is provided with two elements connected in parallel, i.e. a temperature-sensitive interrupter 13 and a fuse 14.

The interrupter 13 will respond by breaking when a pre-determined temperature is reached. The fuse 14 breaks when a determined high voltage is fed through the loop 10 via control box 6, whereby an indication is obtained that the loop is broken, i.e. both the interrupter 13 and the fuse 14 are broken, and the voltage to resistance wire 3 can therefore be interrupted via a control circuit arranged in box 6. The breaking of the connection via fuse 14 takes place a certain time after the interrupter 13 has broken which time can be preset in box 6, and whereby it is certain that the connection has been brought to the correct temperature. After this certain time a high voltage (current surge) is supplied through loop 10 to break the fuse 14.

It will be apparent that with the breaking of the loop 10 it can also be monitored afterward, for instance by means of an external transmitter 15, whether the loop is completely broken, whereby is indicated that the weld has been made with the correct temperature and time. This can take place by closing the external contacts. If the loop is then broken, the time and temperature have then been correct, and if it is not broken then the weld has not been performed correctly.

The embodiment shown in the drawing has many variants. The resistance wire 3 is thus arranged in or around the sleeve 2, but it can likewise be received in an extra element 16 to be placed in sleeve 2, which is then fixed in advance in the sleeve 2.

It is also possible to arrange the loop 10 in the sleeve or in the tube end only by winding it around the tube end and causing the supply of heat to take place by means of an external heat source. This can take place by for instance arranging a heat blanket around the parts 1 and 2 for connecting. It is also possible to supply the heat by means of a hot gas or the like.

In all embodiments it will be apparent that the time is determined subject to the heat capacity to be supplied.

It will be apparent from the above that the method and the device for determining a correct weld between plastic articles, including thermo-curing plastic, are very simple.

What is claimed is:

1. Method for establishing by means of heat treatment a weld or glue connection between two mutually adjacent surfaces of components using an adhesive material, wherein heat is supplied around the weld surfaces for connecting, characterized in that in order to measure the correct quantity of supplied heat and prior to the heat supply, a test loop is arranged around the weld, said test loop being provided with a temperature-sensitive interrupter and an electric fuse connected in parallel thereto, and, a predetermined time after the interrupter has responded as a result of the correct temperature being reached, a current surge is passed through the safety fuse in the loop to break the fuse.

2. Method as claimed in claim 1, characterized in that the heat is generated by a resistance wire arranged around to the weld.

3. Device for performing the method as claimed in claim 2, characterized by a loop-like conducting element which is provided with two members connected in parallel in the form of a temperature-sensitive interrupter on the one hand and a melt wire on the other.

4. Device as claimed in claim 3, characterized by a transmitter for generating a signal in the loop-like element.

5. Method as claimed in claim 2, wherein the components are tubes.

6. Device for performing the method as claimed in claim 1, characterized by a loop-like conducting element which is provided with two members connected in parallel in the form of a temperature-sensitive interrupter on the one hand and a melt wire on the other.

7. Device as claimed in claim 6, characterized by a transmitter for generating a signal in the loop-like element.

8. Method as claimed in claim 1, wherein the components are tubes.

9. Method as claimed in claim 8, wherein the adhesive material is plastic.

10. Method as claimed in claim 9, wherein the heat is generated by a resistance wire embedded in one of the components around said surfaces.

11. Method as claimed in claim 8, wherein the heat is generated by a resistance wire embedded in one of the components around said surfaces.

12. Method as claimed in claim 1, wherein the adhesive material is plastic.

13. Method as claimed in claim 12, wherein the adhesive material is epoxy resin.

14. Method as claimed in claim 12, wherein the heat is generated by a resistance wire embedded in one of the components around said surfaces.

15. Method as claimed in claim 1, wherein the heat is generated by a resistance wire embedded in one of the components around said surfaces.

* * * * *

UNITED STATES PATENT AND TRADEMARK OFFICE
CERTIFICATE OF CORRECTION

PATENT NO.    : 6,229,122 B1
DATED         : May 8, 2001
INVENTOR(S)   : Harry Assen It is certified that error appears in the above-identified patent and that said Letters Patent is hereby corrected as shown below:

<u>Column 3, claim 1,</u>
Line 6, after "characterized in that", insert a comma.

<u>Column 3, claim 2,</u>
Line 15, after "around", delete "to".

Signed and Sealed this

Sixteenth Day of April, 2002

Attest:

JAMES E. ROGAN
*Director of the United States Patent and Trademark Office*

*Attesting Officer*